Jan. 31, 1961     P. E. CHUBA     2,969,975
VEHICLE AIR SUSPENSION SYSTEM BLOWOFF VALVE
Filed Jan. 3, 1957     2 Sheets-Sheet 1

P. E. CHUBA
INVENTOR.

BY E. C. McRae
J. R. Faulkner
D. H. Oster

ATTORNEYS

Jan. 31, 1961 P. E. CHUBA 2,969,975
VEHICLE AIR SUSPENSION SYSTEM BLOWOFF VALVE
Filed Jan. 3, 1957 2 Sheets-Sheet 2

P. E. CHUBA
INVENTOR.

BY E. C. McRae
J. R. Faulkner
T. H. Oster

ATTORNEYS

United States Patent Office

2,969,975
Patented Jan. 31, 1961

2,969,975

VEHICLE AIR SUSPENSION SYSTEM BLOWOFF VALVE

Paul E. Chuba, Center Line, Mich., assignor to Ford Motor Company, Dearborn, Mich., a corporation of Delaware Filed Jan. 3, 1957, Ser. No. 632,309

1 Claim. (Cl. 267—65)

This invention relates to an air suspension system used on automotive vehicles and the like. In particular it involves the novel arrangement in which a minimum pressure exhaust blowoff valve is used on the exhaust side of the leveling valve to prevent the exhaustion of air from the air bag under a predetermined air pressure.

In a constant leveling system, a trim adjustment signal is received from a chassis component such as a suspension member or differential housing of the vehicle through a signal arm secured to the leveling valve. The arm actuates the leveling valve internal parts to add or exhaust air in the individual air bags. There are times, however, when the trim signal called for by the chassis member particularly in the exhaustion of air if followed could be detrimental or otherwise disadvantageous to the operation and/or control of the vehicle. Usually the conditions are temporary such as when cornering the vehicle; but they may also be of the more prolonged type such as the jacking of a vehicle body to remove a tire, or the raising of an automobile on a chassis or axle hoist, or the hanging of a vehicle bumper on a rock or log.

In the cornering condition, the air bags on the outside of the curve are compressed and the air bags on the inside of the curve are extended which calls for additional air on the outside air bags and the exhaustion of air on the inside in an attempt to adjust the body to normal trim height. Upon the completion of the cornering, the vehicle would be lower on one side than on the other necessitating an additional trim adjustment. On a twisting road, this could result in numerous leveling operations involving the unnecessary exhaustion of air. It would be necessary, therefore, to provide a large capacity reserve tank and compressor to handle the necessary air requirements.

Applicant's invention is predicated upon a predetermined air pressure requirement of the air bags when the vehicle is in trim position with a predetermined passenger weight. For example, the static bag pressure of a vehicle may amount to 75 p.s.i. When the bag is extended, air pressure is decreased thus temporarily the bag is under the predetermined desired air pressure. In cornering the vehicle the extended bag actuating arm would call for exhaust while the air in the bag has a reduced air pressure from 25 to 30 p.s.i. Under this condition, the actuating arm would actuate the conventionally provided exhaust valve and release air from the air bag. After negotiating the curve, the vehicle body would be lower on the side which had exhausted the air and the mechanical linkage would call for an additional air supply to arrive at trim height. By providing a minimum pressure exhaust blowoff valve independent of the normal arm actuated valve, air would not be exhausted unless it was over a predetermined minimum pressure which may be set at 5 to 15 p.s.i. lower than the normal bag pressure. As a result, air would not be exhausted from the bag under a predetermined minimum, and the volume of air necessary to fill the air bag to bring it to normal trim height would be considerably less than without the minimum pressure exhaust blowoff valve. The size of the compressor and reserve tank may be of a smaller size. In addition, the bag fill time is decreased measurably making the added air corrections shorter in interval and smaller in amount. The main object of the applicant's invention, therefore, is to provide a minimum pressure exhaust blowoff valve independent of the actuating mechanism which prevents the exhaustion of air from the bag under a predetermined air pressure.

Another object is to provide a leveling valve arrangement in which a minimum pressure exhaust blowoff valve is utilized on the exhaust side of the leveling valve.

Still another object is to provide a leveling valve arrangement in a constant leveling air suspension system which prevents the exhaustion of air when a vehicle is cornering under a predetermined air pressure.

Still another object is to provide a leveling valve arrangement embodying a minimum pressure exhaust blowoff valve which conserves air and reduces bag fill-up time.

Other objects and advantages will become more apparent as the description proceeds particularly in connection with the accompanying drawings in which.

Figure 1:
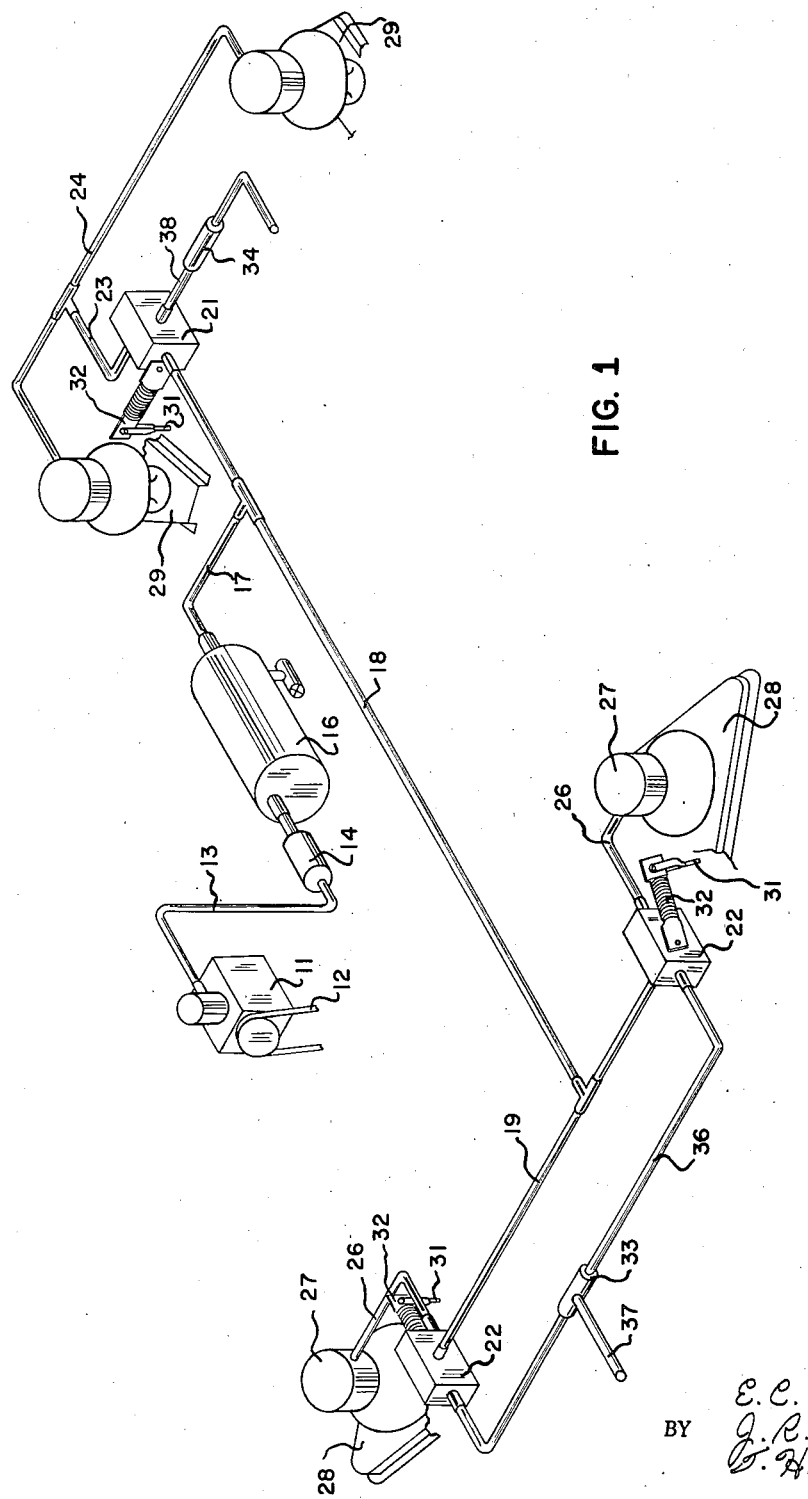
Figure 1 is a schematic drawing of a portion of an air suspension system in which the minimum pressure exhaust blowoff valve is located outside of the leveling valve.

Referring now to the drawings, an air compressor is indicated at 11 driven by an engine accessory (not shown) through a belt 12. Discharge line 13 directs the pressurized air through a one-way check valve 14 into the reserve tank 16. Tank 16 is connected by conduits 17, 18 and 19 to the rear leveling valve 21 and the front leveling valves 22. From the leveling valves 21 and 22, conduits 23, 24 and 26 direct the air into the individual air bags 27 mounted on suspension members 28 and 29. Leveling valves 21 and 22 control the intake and exhaust of air from the air bags 27. When the front suspension members 28 move in a vertical direction, this movement is transferred to a link 31 (shown in part) which in turn is connected to the leveling valve actuating arm 32. The connection between the link 31 and the suspension members 28 is not shown in the drawings. The rear leveling valve 21 is also actuated by the link 31 and the arm 32, but in this instance the link 31 is secured to the front of the differential housing (not shown).

In the adaption shown in Figure 1, a minimum pressure exhaust blowoff valve, indicated at 33 and 34, is provided for the front and rear air bags respectively. Front valve 33 is located medially of the exhaust tube 36 which connects the two leveling valves 22 together. Exhaust air must go through the minimum pressure exhaust blowoff valve 33 before being expelled through the short tube 37 into the atmosphere. In the rear air bag suspension system, the single leveling valve 21 controls the two rear air bags and the minimum pressure exhaust blowoff valve 34 is located medially of the exhaust tube 38 through which the air must go through before being released into the atmosphere. It is to be understood that the valves 33 and 34 are of the commercially available type and may be of the kind which close when the pressure is below that point for which they are set.

Figure 2:
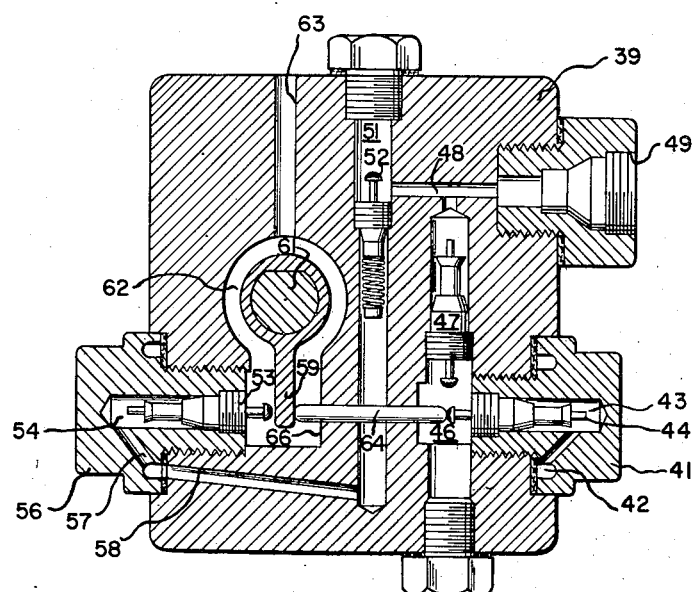
Figure 2 is a cross section of the leveling valve and showing a modification of the invention wherein the minimum pressure exhaust blowoff valve is located between the air bag and the conventional exhaust valve.
Figure 3:
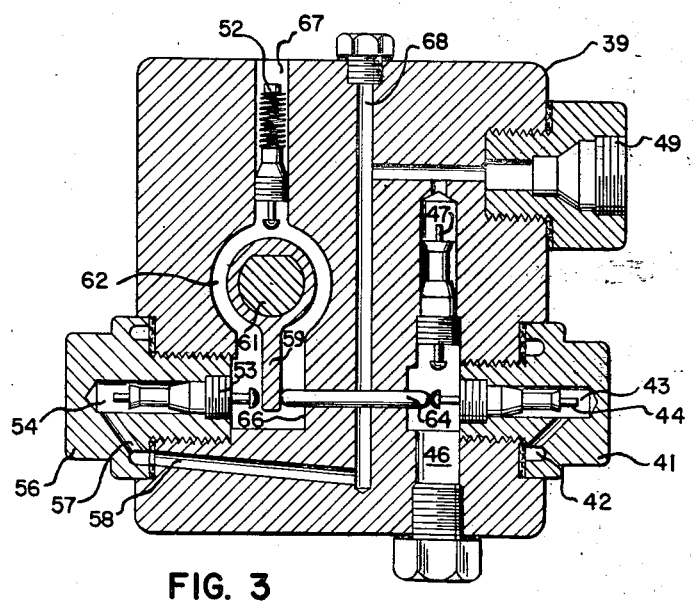
Fig. 3 is still another modification similar to Figure 2 and illustrating the use of an exhaust valve interposed between the conventional exhaust valve and atmosphere.

Figures 2 and 3 represent modifications wherein the minimum pressure exhaust blowoff valve is made a part of the leveling valve assembly. Referring now to Figure 2, a leveling valve housing is indicated at 39. An internally cored cap 41 has an intake passage 42 which is connected in a conventional manner (not shown) to either the conduit 18 or 19. Intake passage 42 connects to axially extending passage 43 in which is secured an intake valve 44 shown in its closed position. Intake valve 44 is normally closed until physically opened. Air passing through the intake valve 44 is directed through generally vertical passage 46 in which is secured a low pressure valve 47 which opens at a small pressure of 2 to 4 p.s.i. Valve 47 acts as a check valve and prevents the air from backing up into the intake passage 41 and 42. Passage 46 joins in T fashion to a generally horizontal passage 48 open at one end to the air bag 27 through the cap 49 and at the other end to the vertically extending exhaust passage 51 in which is secured the minimum pressure exhaust blowoff valve 52. It can be seen that the valve 52 by itself is independent of the normally physically operated exhaust valve 53 mounted in passage 54 of the cap 56. Passage 54 is connected to exhaust passage 51 by passages 47 and 58.

The controlling of the intake and exhaust of air is normally done by the arm 59 journaled on shaft 61 which is secured to the actuating arm 32. Arm 59 moves in a pendulum motion in the cavity 62 in the direction directed by the actuating arm 32 as it rocks the shaft 61. When moved clockwise, arm 59 physically opens the normal exhaust valve 53. When the movement is counterclockwise, arm 59 moves laterally spacer rod 64 mounted in wall 66 and opening the intake valve 44.

In actual operation, when air is required arm 59 moves counterclockwise moving spacer 64 laterally and opening the intake valve 44 allowing the air to move through check valve 47 through passage 48, cap 49, through conduits 23, 24 or 26 threadably connected to cap 49 (not shown) and into the air bags 27. When the actuating arm 32 transmits an exhaust signal, the arm 59 moves in a clockwise direction opening the normal exhaust valve 53. If the minimum pressure exhaust blowoff valve 52 is closed because the air pressure in the bag 27 is less than that pressure required to open the valve 52, no air will be exhausted from the air bag even though the normal exhaust valve 53 is open. If the bag pressures are greater than the setting of the minimum pressure exhaust blowoff valve 52, the valve will be open and air will flow from the bags 27, through conduits 23, 24 or 26, cap 49, passage 48, valve 52, passages 58, 57, 54, exhaust valve 53, cavity 62 and out through passage 63 into the atmosphere. This exhaust of air will continue until the mechanical linkage closes the normal exhaust valve 53 or the pressure decreases to that point at which the minimum pressure exhaust blowoff valve 52 will close.

A third modification is shown in Figure 3 which incorporates substantially the structure and parts employed in Figure 2. It differs, however, in that the minimum pressure exhaust blowoff valve 52 is inverted in position in passage 66 which is the same as passage 63 except for being changed to permit its installation. Passage 68 is similar to passage 51 except for simplification resulting from the removal of the valve 52. The intake operation of the Figure 3 structure is identical to that of the Figure 2 modification. In the exhausting of air, however, the normal exhaust valve 53 is opened permitting bag air to pass through into the cavity 62. In this instance, the minimum pressure exhaust valve would be closed and would remain so preventing the escape of air until the air pressure rose above the minimum setting of the valve 52.

As can be seen, the applicant's novel use and arrangement of employing the minimum pressure exhaust blowoff valve effectively prevents the partial emptying of a bag under temporary conditions (cornering, bumps) and the emptying of atmospheric pressure when the car body is raised relative to the wheels (jacking and hoisting). By minimizing the exhaustion of air, a lesser amount is required for replenishment of the bag thus decreasing corrective bag air requirements and bag fill time.

It will be understood that the invention is not to be limited to the exact construction shown and described, but that various changes and modifications may be made without departing from the spirit and scope of the invention, as defined in the appended claim.

What is claimed is:

A leveling valve arrangement for controlling the release of air from an air spring for a motor vehicle suspension system, said valve arrangement comprising a housing having an intake port and an exhaust port, an intake valve and an exhaust valve positioned in said ports respectively, said valves being normally closed, a port communicating with the air spring and air passage means interconnecting said ports, a check valve in the air passage means connecting the intake port with the exhaust port normally permitting air to be passed through it into the air spring, means responsive to height variations in the vehicle suspension system including a shaft journaled in said housing for rotational movement thereof and a lever arm journaled on said shaft and a spacer interposed between the lever arm and said intake valve, said lever arm being normally positioned adjacent and between the exhaust valve and the spacer, and a minimum pressure exhaust blowoff valve interposed in the exhaust port in the housing adjacent to atmosphere whereby air from the air spring upon actuation of the exhaust valve by the lever arm will not escape into the atmosphere unless said air pressure is in excess of the predetermined setting of the minimum pressure exhaust blowoff valve.

References Cited in the file of this patent

UNITED STATES PATENTS

| | | |
|---|---|---|
| 2,361,575 | Thompson | Oct. 31, 1944 |
| 2,670,201 | Rossman | Feb. 23, 1954 |
| 2,809,051 | Jackson | Oct. 8, 1957 |
| 2,874,957 | Davis | Feb. 24, 1959 |